(12) United States Patent
Kawazu et al.

(10) Patent No.: US 11,634,180 B2
(45) Date of Patent: Apr. 25, 2023

(54) VEHICLE BODY REAR PART STRUCTURE

(71) Applicant: Honda Motor Co., Ltd., Tokyo (JP)

(72) Inventors: Masahiro Kawazu, Saitama (JP); Hiroyuki Yasuda, Tokyo (JP); Kei Ichikawa, Tokyo (JP); Hitomi Ezura, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/500,924

(22) Filed: Oct. 13, 2021

(65) Prior Publication Data

US 2022/0111907 A1   Apr. 14, 2022

(30) Foreign Application Priority Data

Oct. 14, 2020   (JP) .............................. JP2020-173534

(51) Int. Cl.
*B62D 25/08* (2006.01)
*B62D 27/02* (2006.01)
*B62D 25/02* (2006.01)
*B62D 25/06* (2006.01)

(52) U.S. Cl.
CPC ........... *B62D 25/08* (2013.01); *B62D 25/025* (2013.01); *B62D 25/06* (2013.01); *B62D 25/088* (2013.01); *B62D 27/023* (2013.01)

(58) Field of Classification Search
CPC ...... B62D 25/06; B62D 25/08; B62D 25/088; B62D 25/025; B62D 27/023
USPC ................. 296/23.01, 3, 4, 209, 210, 29, 30
See application file for complete search history.

(56) References Cited

U.S. PATENT DOCUMENTS 4,717,197 A * 1/1988 Harasaki ................ B62D 25/02
                                                          296/202

FOREIGN PATENT DOCUMENTS

| DE | 102016011024 B4 * | 8/2020 | ............ B60J 5/0444 |
| JP | 2016043765 | 4/2016 | |
| JP | 6540237 | 7/2019 | |

OTHER PUBLICATIONS

Translation of DE1020016011024 (Year: 2020).*

* cited by examiner

*Primary Examiner* — Dennis H Pedder
(74) *Attorney, Agent, or Firm* — JCIPRNET (57) ABSTRACT

The disclosure provides a vehicle body rear part structure. The vehicle body rear part structure includes a load support part on a quarter pillar. The load support part includes a side sill stiffener, a quarter pillar stiffener and a damper stiffener. The side sill stiffener reinforces a side sill and forms a part of the quarter pillar. The quarter pillar stiffener is provided continuously with the side sill stiffener and reinforces the quarter pillar. The damper stiffener is provided above a rear wheel house and joined to the quarter pillar stiffener and a roof side rail.

12 Claims, 9 Drawing Sheets

VEHICLE BODY REAR PART STRUCTURE

CROSS-REFERENCE TO RELATED APPLICATION

This application claims the priority benefit of Japan application serial no. 2020-173534, filed on Oct. 14, 2020. The entirety of the above-mentioned patent application is hereby incorporated by reference herein and made a part of this specification.

BACKGROUND

Technical Field

The disclosure relates to a vehicle body rear part structure.

Description of Related Art

As a vehicle body rear part structure, for example, a structure is disclosed which joins three members including a rocker outer reinforcement, a quarter lock pillar reinforcement, and a quarter pillar reinforcement. According to this vehicle body rear part structure, it is possible to increase the rigidity of the quarter pillar and suppress the deformation of the joint by joining the reinforcements of the three members (see, for example, Patent Document 1).

Further, as a vehicle body rear part structure, for example, a structure is disclosed in which a side sill reinforcing member for connecting a side sill and a rear wheel house is provided, and a ridge line of the side sill reinforcing member and a ridge line of a rear wheel house reinforcing member are continuous. According to this vehicle body rear part structure, it is possible to increase the rigidity of a door opening and the torsional rigidity of the vehicle body (see, for example, Patent Document 2).

RELATED ART

Patent Document

[Patent Document 1] Japanese Laid-open No. 2016-43765
[Patent Document 2] Japanese Patent No. 6540237

Incidentally, in the vehicle body rear part structure, for example, when the vehicle body is twisted, the side sill and the roof side rail are bent, and a tensile load is applied to the door opening flange of the quarter pillar. However, since the vehicle body rear part structure of Patent Document 1 cannot reinforce the joints between the reinforcement members and the rear door opening around the quarter pillar reinforcement, it may be difficult to sufficiently support the tensile load of the quarter pillar.

Further, in the vehicle body rear part structure, for example, when an aluminum alloy panel is applied to the outer plate, the body rigidity is reduced due to the reduction in the surface rigidity of the outer plate. Therefore, it is necessary to recover the body rigidity. However, the vehicle body rear part structure of Patent Document 2 is provided with a load transmission path only in the door opening between the side sill and the quarter pillar. Therefore, it may be difficult to sufficiently support the tensile load generated due to the twisting of the vehicle body.

The disclosure provides a vehicle body rear part structure capable of increasing the rigidity of the vehicle body rear part against the twisting of the vehicle body.

SUMMARY

In view of the above issues, the disclosure provides the following configurations.

(1) A vehicle body rear part structure according to the disclosure is a vehicle body rear part structure (for example, the vehicle body rear part structure 10 of the embodiment) including: a side sill (for example, the side sill 12 of the embodiment) that is disposed extending below a door opening (for example, the door opening 20 of the embodiment) and in a vehicle body front-rear direction; a roof side rail (for example, the roof side rail 14 of the embodiment) that is disposed extending above the door opening and in the vehicle body front-rear direction; a quarter pillar (for example, the quarter pillar 15 of the embodiment) that connects a vehicle body rear side of the side sill and the roof side rail; and a rear wheel house (for example, the rear wheel house 16 of the embodiment) that forms a part of the quarter pillar. The quarter pillar includes a load support part (for example, the load support part 30 of the embodiment) that has a door opening flange (for example, the door opening pillar flange 29 of the embodiment) that forms an edge part of the door opening. The load support part includes: a side sill stiffener (for example, the side sill stiffener 31 of the embodiment) that reinforces the side sill and forms a part of the quarter pillar; a quarter pillar stiffener (for example, the quarter pillar stiffener 32 of the embodiment) that is provided continuously with the side sill stiffener and reinforces the quarter pillar; and a damper stiffener (for example, the damper stiffener 33 of the embodiment) that is provided above the rear wheel house and joined to the quarter pillar stiffener and the roof side rail.

DESCRIPTION OF THE EMBODIMENTS

Here, when the vehicle body is twisted, the side sill and the roof side rail are bent, whereby the quarter pillar is pulled, and a tensile load is applied to the quarter pillar.

Therefore, according to this configuration, the load support part of the quarter pillar is formed by joining the side sill stiffener, the quarter pillar stiffener, and the damper stiffener. Further, the load support part has the door opening flange that forms the edge part of the door opening.

Therefore, the rigidity of the door opening flange can be ensured by the load support part. Further, the edge part of the door opening (quarter pillar) is formed by the door opening flange. Therefore, the rigidity of the quarter pillar is ensured by the door opening flange. As a result, a tensile load applied to the quarter pillar can be sufficiently supported by the load support part (that is, the door opening flange).

Further, the damper stiffener is used as a member for reinforcing the quarter pillar. The damper stiffener is joined to the roof side rail. Therefore, the tensile load concentrated on the quarter pillar can be distributed to the roof side rail and the vehicle body rear part.

In this way, the tensile load applied to the quarter pillar can be sufficiently supported by the load support part (that is, the door opening flange), and in addition, the tensile load concentrated on the quarter pillar can be distributed to the roof side rail and the vehicle body rear part. As a result, for example, the rigidity of the vehicle body rear part can be increased against the twisting of the vehicle body.

(2) The damper stiffener may include a damper stiffener body part (for example, the damper stiffener body part 81 of the embodiment) and a damper stiffener flange part (for example, the damper stiffener flange part 82 of the embodiment), and in the damper stiffener flange part, a first damper flange (for example, the first damper flange 86 of the embodiment) on a vehicle body front side may be joined to the door opening flange, and at least one of a second damper flange (for example, the second damper flange 87 of the embodiment) on the vehicle body rear side and a third damper flange (for example, the third damper flange 88 of the embodiment) on a vehicle body upper side may be joined to the roof side rail.

According to this configuration, the first damper flange of the damper stiffener flange part is provided on the upper part of the quarter pillar. As a result, the quarter pillar is reinforced by the first damper flange, whereby the rigidity of the quarter pillar can be ensured.

Further, the second damper flange and/or the third damper flange of the damper stiffener flange part are joined to the roof side rail. Therefore, a load applied to the door opening flange of the quarter pillar can be transmitted to the vehicle body rear side via the damper stiffener and the roof side rail. As a result, the load applied to the connection part between the quarter pillar and the roof side rail can be alleviated, and the rigidity of the vehicle body rear part can be increased.

(3) The load support part may include at least one side sill stiffener ridge line part (for example, the first load support ridge line part 101 and the second load support ridge line part 102 of the embodiment) that is disposed extending continuously from a front end of the side sill stiffener to the roof side rail.

According to this configuration, at least one side sill stiffener ridge line part is disposed extending continuously from the front end of the side sill stiffener to the roof side rail. Further, the first damper flange is joined to the upper part of the quarter pillar. Further, the second damper flange and/or the third damper flange of the damper stiffener flange part are joined to the roof side rail.

Therefore, the load applied to the quarter pillar can be transmitted to the roof side rail via the side sill stiffener ridge line part, and the load transmitted to the roof side rail can be transmitted to the vehicle body rear side via the roof side rail. As a result, the load applied to the connection part between the quarter pillar and the roof side rail can be alleviated, and the rigidity of the vehicle body rear part can be increased.

(4) The vehicle body rear part structure may further include a rear side frame (for example, the rear side frame 13 of the embodiment) that is connected to the side sill on an inner side in a vehicle width direction and has a bent part (for example, the bent part 25 of the embodiment) inclined upward toward the vehicle body rear side. The side sill stiffener may include a hat cross section part (for example, the hat cross section part 41 of the embodiment) that is disposed at a rear end of the side sill and on an outer side in the vehicle width direction and is convex outward in the vehicle width direction. The hat cross section part may be provided with an inclined wall (for example, the hat inclined side wall 51 of the embodiment) that is inclined inward in the vehicle width direction toward the vehicle body rear side. A rear end (for example, the rear end 51a of the embodiment) of the inclined wall may be disposed on a vehicle body front side with respect to the bent part of the rear side frame.

According to this configuration, the inclined wall of the hat cross section part can be disposed toward the rear side frame by being inclined inward in the vehicle width direction. Further, the rear end of the inclined wall is disposed on the vehicle body front side with respect to the bent part of the rear side frame. The hat cross section part is connected to the side sill. Therefore, a load generated due to the twisting of the vehicle body can be efficiently transmitted from the side sill to the rear side frame via the inclined wall of the hat cross section part.

Further, the side sill stiffener having the hat cross section part is connected to the quarter pillar. As a result, a load generated on the side sill due to the twisting of the vehicle body can be supported by the quarter pillar and the rear side frame, and the bending rigidity of the side sill (that is, the rigidity of the vehicle body rear part) can be increased.

(5) The side sill stiffener may be provided with a welded part (for example, the welded part 42 of the embodiment) joined to the rear side frame on the vehicle body rear side with respect to the inclined wall, and the welded part may be provided at at least one of a position on the vehicle body front side with respect to the bent part and a position overlapping the bent part in the vehicle body front-rear direction.

According to this configuration, the side sill stiffener is joined to the rear side frame at the welded part, and the welded part is provided on the vehicle body rear side with respect to the inclined wall. Further, the welded part is provided at at least one of the position on the vehicle body front side with respect to the bent part and the position overlapping the bent part. As a result, a load applied to the side sill can be more efficiently transmitted to the rear side frame via the welded part.

(6) The rear side frame may include: a frame body part (for example, the frame body part 23 of the embodiment) that extends to the vehicle body rear side; and a connecting part (for example, the connecting part 22 of the embodiment) that is connected to the side sill and has the bent part formed thereon. In the connecting part, a lower surface part (for example, the front lower part 24a of the embodiment) on the vehicle body front side with respect to the bent part may overlap a lower surface part (for example, the hat lower part 53 of the embodiment) of the hat cross section part in an up-down direction.

According to this configuration, the lower surface part of the connecting part overlaps the lower surface part of the hat cross section part in the up-down direction on the vehicle body front side with respect to the bent part. Therefore, the lower surface part of the hat cross section part can be set at the same height as the lower surface part of the connecting part on the vehicle body front side with respect to the bent part. As a result, a load applied to the side sill can be more efficiently transmitted to the rear side frame via the hat cross section part.

(7) The side sill stiffener may have a side sill stiffener lower ridge line part (for example, the side sill stiffener lower ridge line part 43 of the embodiment) that forms a lower ridge line part of the hat cross section part and extends in the vehicle body front-rear direction, and the side sill stiffener lower ridge line part may have an inclined ridge line part (for example, the second lower ridge line part 66 of the embodiment) that is disposed on the vehicle body rear side with respect to the inclined wall and is inclined upward toward the vehicle body rear side.

According to this configuration, the side sill stiffener lower ridge line part includes the inclined ridge line part, and the inclined ridge line part is disposed on the vehicle body rear side of the inclined wall. Further, the inclined ridge line part is inclined upward toward the vehicle body rear side. Therefore, for example, even if a part of the load applied to the side sill cannot be completely transmitted to the rear side frame, it can be transmitted to the quarter pillar via the inclined ridge line part. That is, the load applied to the side sill can be supported by the rear side frame and the quarter pillar without being transmitted to the rear wheel house.

Here, the rigidity of the rear wheel house is suppressed as compared with the side sill, the roof side rail, the quarter pillar, and the like that form the skeleton of the vehicle body. As a result, the load applied to the side sill can be supported by the rear side frame and the quarter pillar without being transmitted to the rear wheel house, whereby the rigidity of the vehicle body rear part can be increased.

(8) The inclined ridge line part may be inclined along the shape of the bent part of the rear side frame in a side view.

According to this configuration, the inclined ridge line part is inclined along the shape of the bent part of the rear side frame. As a result, for example, the load applied to the side sill can be transmitted to the rear side frame via the inclined ridge line part.

(9) The side sill stiffener may include a concave cross section part (for example, the concave cross section part 44 of the embodiment) that is provided on the vehicle body rear side with respect to the hat cross section part and is convex inward in the vehicle width direction. The hat cross section part and the concave cross section part may include: a side sill stiffener flange (for example, the side sill stiffener upper flange 45 of the embodiment) that is continuously provided in the vehicle body front-rear direction at an upper part and forms the door opening flange; and a side sill stiffener ridge line part (for example, a second side sill stiffener upper ridge line part 47 of the embodiment) that is continuously provided in the vehicle body front-rear direction below the side sill stiffener flange and forms a ridge line of the door opening. The side sill stiffener ridge line part may be continuously provided to intersect the side sill stiffener flange in a top view.

According to this configuration, the side sill stiffener is provided with the side sill stiffener ridge line part and the side sill stiffener flange. Further, the ridge line of the door opening is formed by the side sill stiffener ridge line part, and the door opening flange is formed by the side sill stiffener flange. Further, the side sill stiffener ridge line part is continuously provided to intersect the side sill stiffener flange in a top view.

Here, the side sill stiffener is provided to be continuous with the quarter pillar that has high rigidity. As a result, the load applied to the side sill can be efficiently transmitted to the door opening of the quarter pillar that has high rigidity via the side sill stiffener ridge line part and the side sill stiffener flange of the side sill stiffener.

According to the disclosure, the load support part of the quarter pillar is formed by joining the side sill stiffener, the quarter pillar stiffener, and the damper stiffener. As a result, the rigidity of the vehicle body rear part can be increased against the twisting of the vehicle body.

Hereinafter, a vehicle body rear part structure according to an embodiment of the disclosure will be described with reference to the drawings. In the drawings, an arrow FR indicates the front side of the vehicle, and an arrow UP indicates the upper side of the vehicle, and an arrow LH indicates the left side of the vehicle. Further, the vehicle is not particularly limited in terms of use and type, and an automobile will be described as an example of the embodiment.

<Vehicle>

Figure 1:
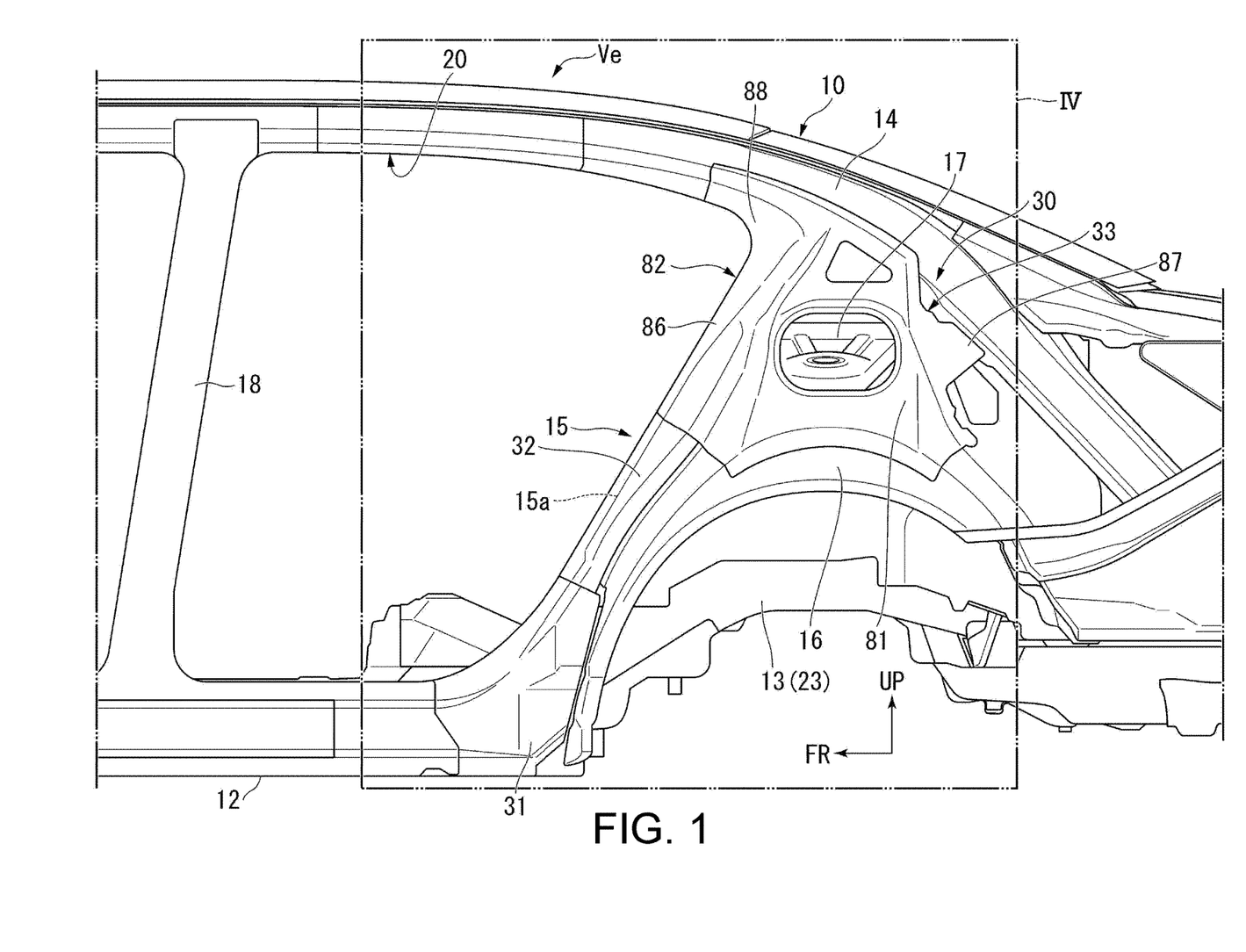
FIG. 1 is a side view showing a vehicle body rear part structure of an embodiment according to the disclosure.
Figure 2:
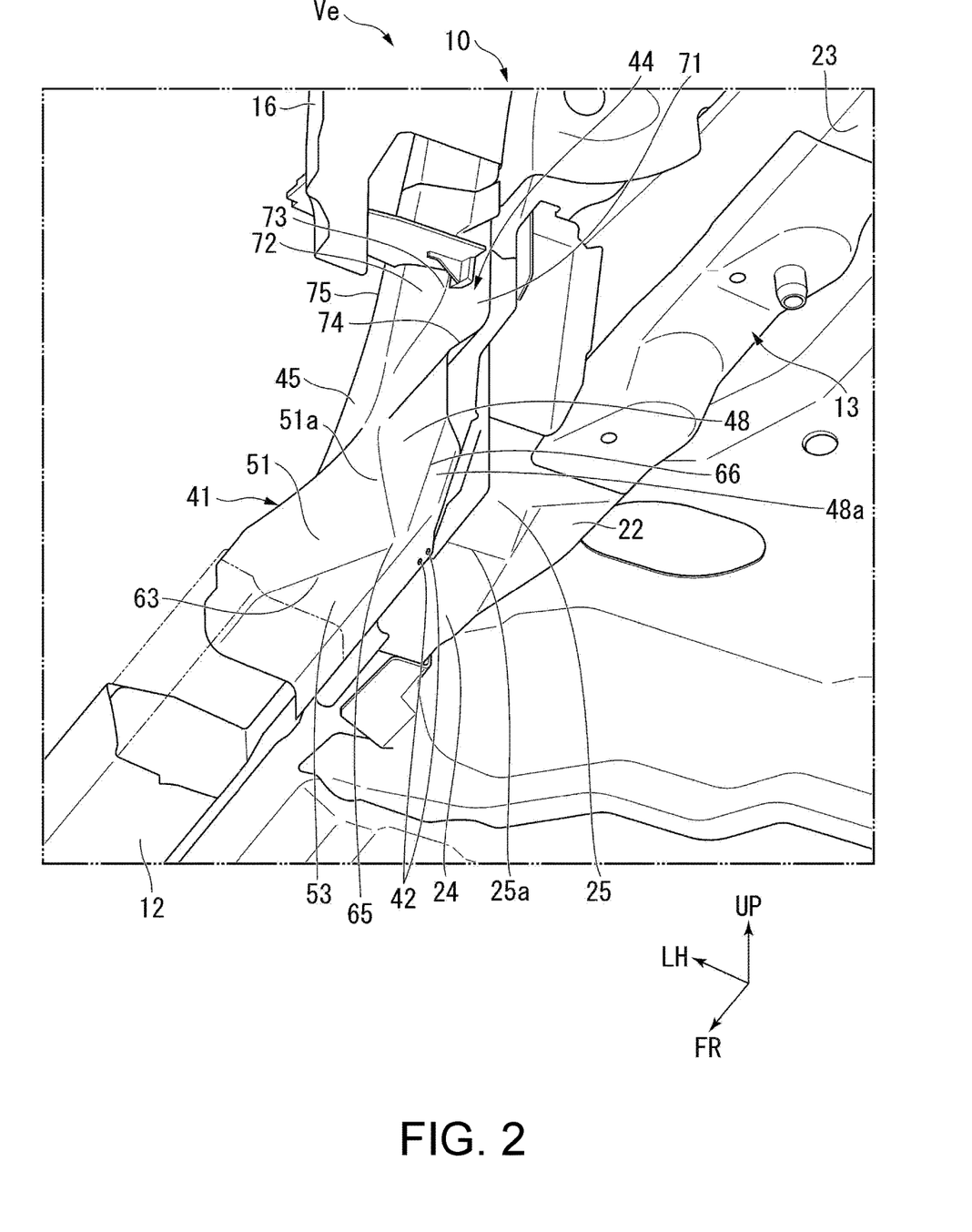
FIG. 2 is a perspective view of the vehicle body rear part structure of an embodiment as viewed from the lower left side of the vehicle body rear side.

As shown in FIGS. 1 and 2, a vehicle Ve includes, for example, a vehicle body rear part structure 10 at the rear part of the vehicle. Since the vehicle body rear part structure 10 is configured to be substantially left-right symmetrical, the configuration on the left side will be described in detail below, and the description of the configuration on the right side will be omitted.

<Vehicle Body Rear Part Structure>

The vehicle body rear part structure 10 includes, for example, a side sill 12, a rear side frame 13, a roof side rail 14, a quarter pillar 15, and a rear wheel house 16. In the vehicle body rear part structure 10, a rear door opening 20 is formed by the side sill 12, the roof side rail 14, a center pillar 18, and the quarter pillar 15. Hereinafter, the rear door opening 20 is simply referred to as the "door opening 20."

The door opening 20 is opened and closed by a rear side door (not shown), and is used, for example, for a passenger to get in and out of the vehicle with the rear side door open.

The side sill 12 is disposed extending in the vehicle body front-rear direction below the door opening 20 and along the left side of a floor (not shown) at the lower part on the left outer side in the vehicle width direction. The side sill 12 forms the lower part of the door opening 20. The side sill 12 is, for example, a member having high rigidity formed in a hollow closed cross section of a rectangular cross section, and configures the skeleton of the vehicle body.

The rear side frame 13 is connected on the inner side in the vehicle width direction at the rear end part of the side sill 12. The rear side frame 13 is, for example, inclined inward in the vehicle width direction from the rear end part of the side sill 12 toward the vehicle body rear side. The rear side frame 13 is, for example, a member having high rigidity formed in a hollow closed cross section of a rectangular cross section and configures the skeleton of the vehicle body.

Figure 3:
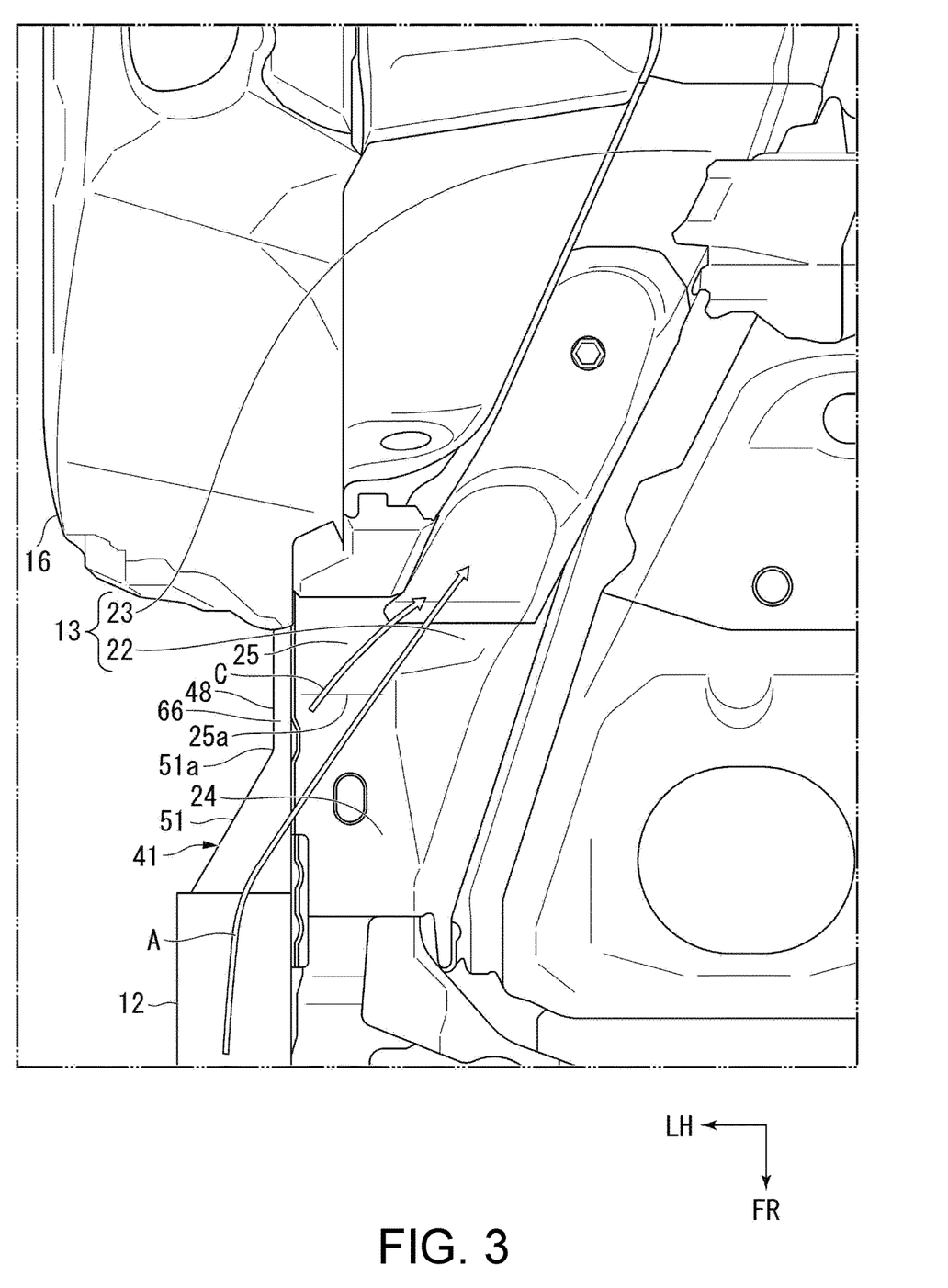
FIG. 3 is a bottom view of the vehicle body rear part structure of an embodiment as viewed from below.

As shown in FIGS. 2 and 3, the rear side frame 13 includes a connecting part 22 and a frame body part 23. The connecting part 22 is connected on the inner side in the vehicle width direction at the rear end part of the side sill 12. The connecting part 22 has a bent part 25 at a lower connecting part 24.

The bent part 25 is connected on the inner side in the vehicle width direction at the rear end part of the side sill 12. The bent part 25 is inclined upward from a folded part 25*a* toward the vehicle body rear side.

The front end part of the frame body part 23 is connected to the connecting part 22. The frame body part 23 extends to be inclined inward in the vehicle width direction from the connecting part 22 toward the vehicle body rear side.

With reference back to FIG. 1, the roof side rail 14 is disposed extending in the vehicle body front-rear direction above the door opening 20 and along the left side of a roof (not shown) at the upper part on the left outer side in the vehicle width direction. The roof side rail 14 forms the upper part of the door opening 20. The roof side rail 14 is, for example, a member having high rigidity formed in a hollow closed cross section, and configures the skeleton of the vehicle body.

The center pillar 18 is disposed at a distance on the vehicle body front side from the quarter pillar 15 and forms the front part of the door opening 20. The center pillar 18 is a member having high rigidity that connects the side sill 12 and the roof side rail 14, and configures the skeleton of the vehicle body. The rear side door that opens and closes the door opening 20 is supported on the center pillar 18 via a hinge (not shown).

The quarter pillar 15 is a member having high rigidity that connects the rear end part of the side sill 12 (that is, the vehicle body rear side of the side sill 12) and the roof side rail 14, and configures the skeleton of the vehicle body. The quarter pillar 15 includes a quarter pillar body 28. The quarter pillar body 28 extends linearly to incline to the vehicle body rear side as it goes upward from the rear end part of the side sill 12 to the roof side rail 14, and forms the rear part of the door opening 20.

Further, the quarter pillar 15 includes a load support part 30. The load support part 30 will be described in detail later.

The rear wheel house 16 is a member provided on the vehicle body rear side of the quarter pillar 15 and covers the upper part of a rear wheel.

<Load Support Part>

Figure 4:
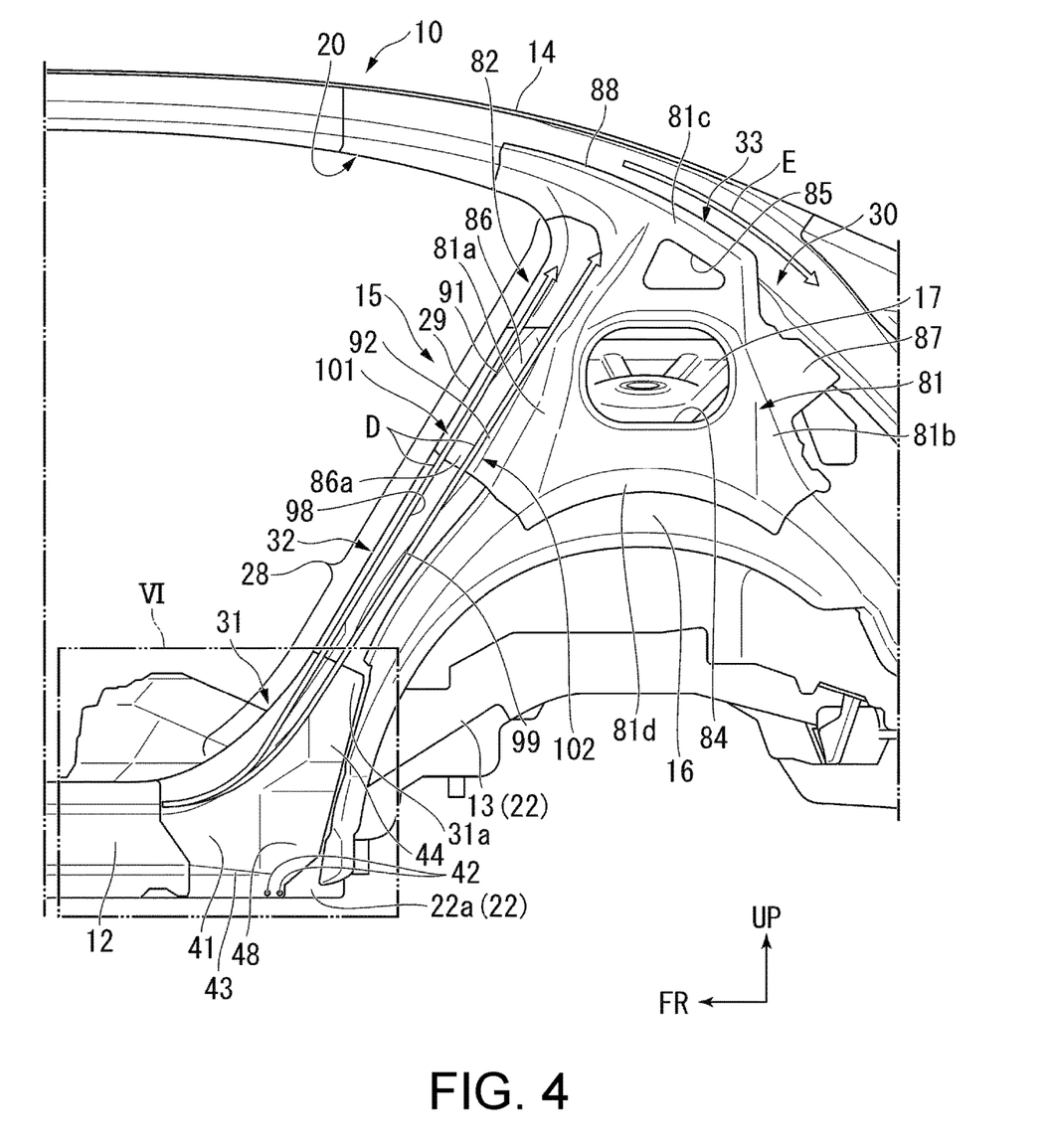
FIG. 4 is an enlarged side view of the IV portion of FIG. 1.
Figure 5:
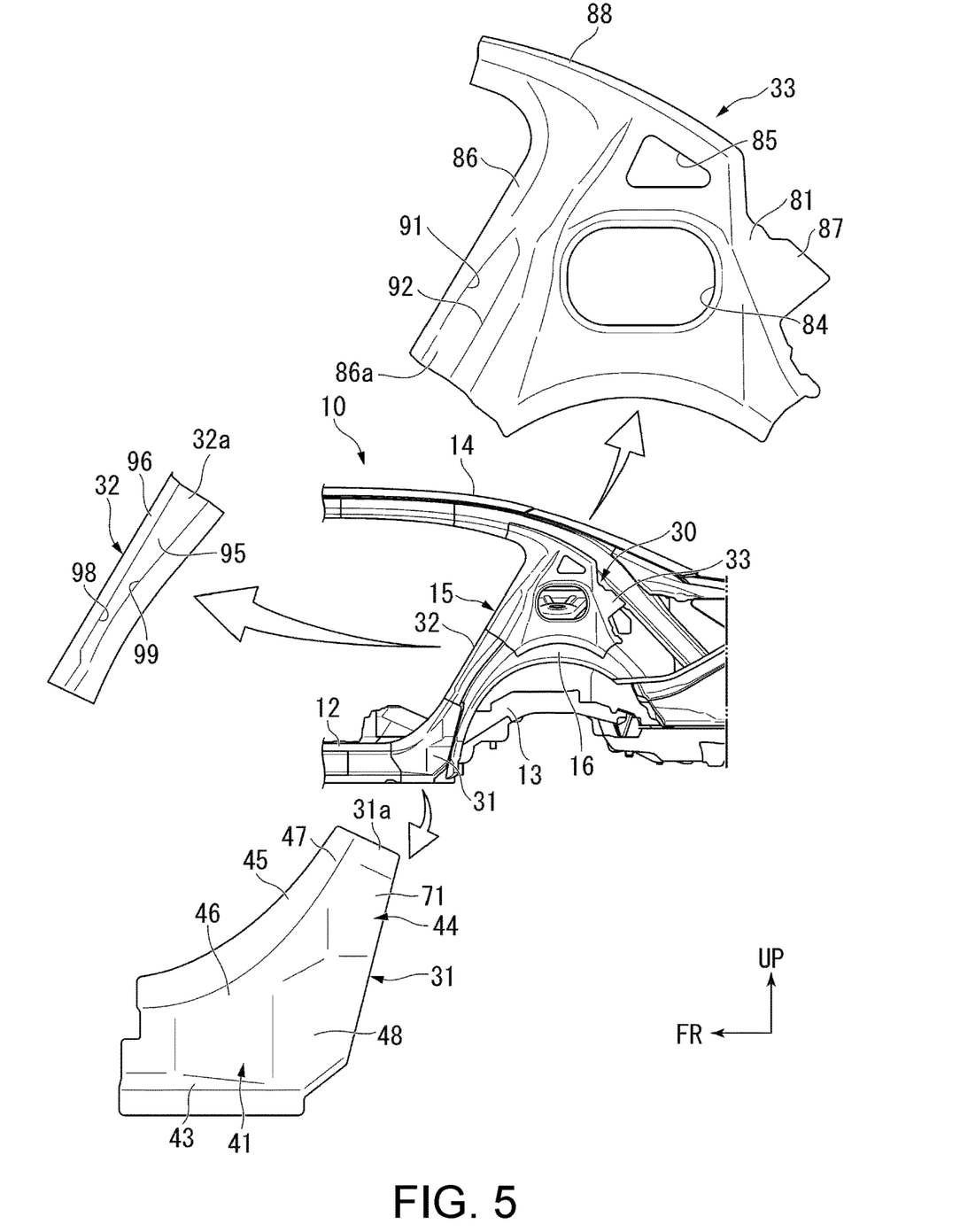
FIG. 5 is a side view showing in imaginary lines individual parts of the load support part provided in the vehicle body rear part structure of an embodiment.

As shown in FIGS. 4 and 5, the load support part 30 has a door opening pillar flange (door opening flange) 29 that corresponds to the quarter pillar 15 (specifically, to the quarter pillar body 28) among the door opening 20. The door opening pillar flange 29 forms a pillar edge part (edge part) of the portion that corresponds to the quarter pillar body 28 among the door opening 20. That is, the door opening pillar flange 29 forms the pillar edge part of the quarter pillar body 28.

The load support part 30 includes a side sill stiffener 31, a quarter pillar stiffener 32, and a damper stiffener 33.

(Side Sill Stiffener)

Figure 6:
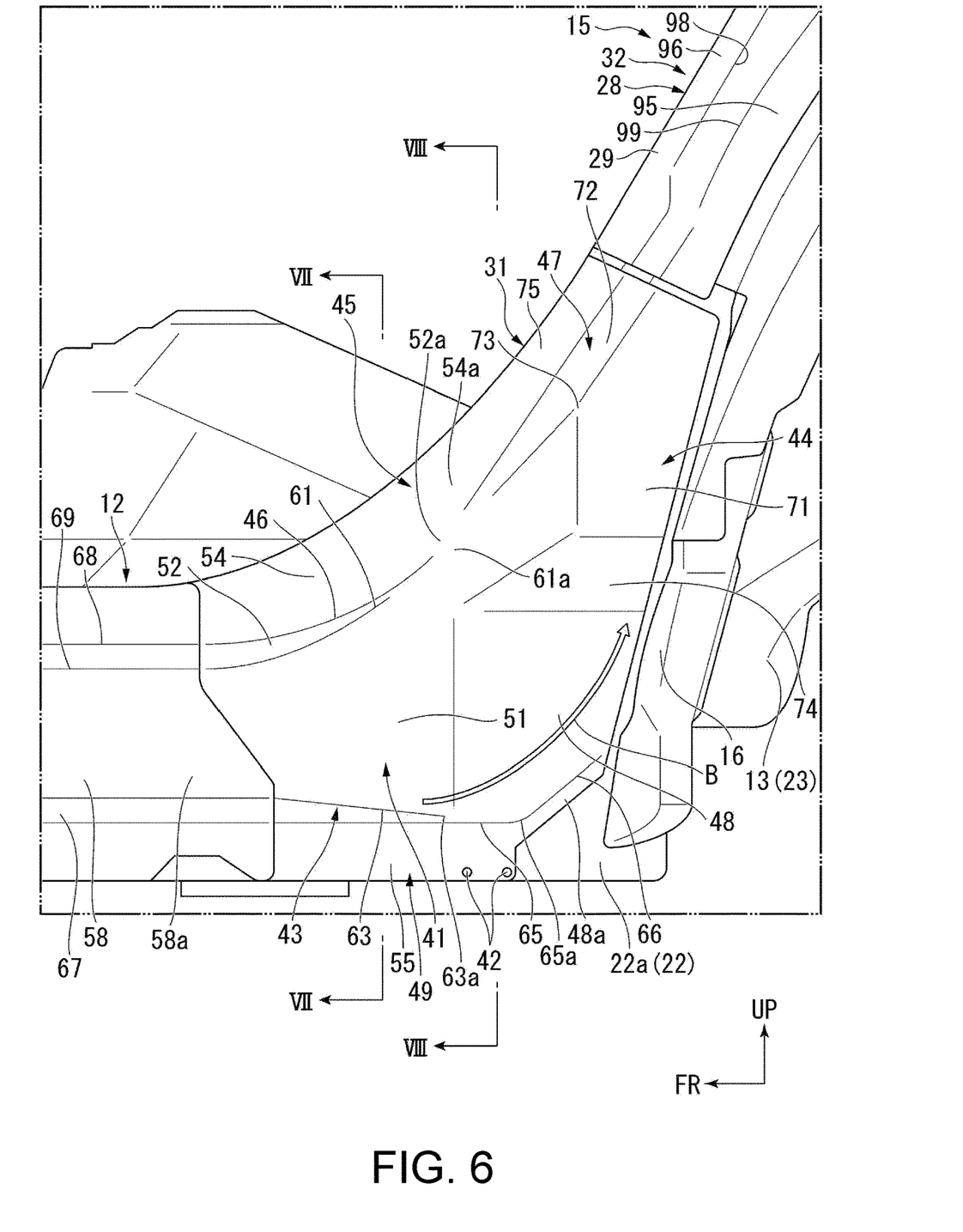
FIG. 6 is an enlarged side view of the VI portion of FIG. 4.
Figure 7:
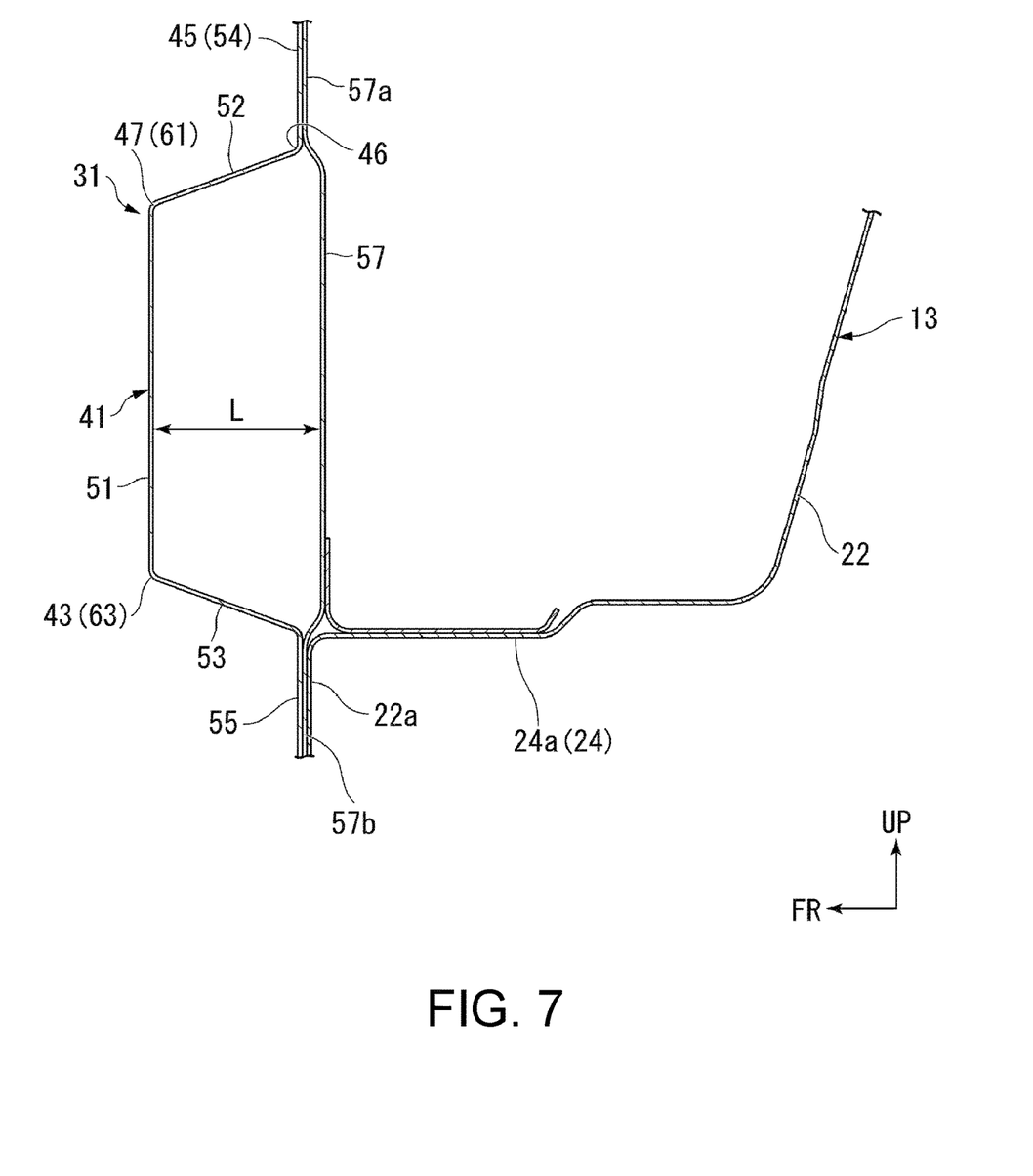
FIG. 7 is a cross-sectional perspective view taken along the line VII-VII of FIG. 6.

As shown in FIGS. 6 and 7, the side sill stiffener 31 is a member provided at the rear end part of the side sill 12 and forms a part of the rear end part of the side sill 12. Further, the side sill stiffener 31 is a member that forms a part (specifically, the lower part) of the quarter pillar body 28. That is, the side sill stiffener 31 is a member that configures a part (rear part) of the side sill 12 and a part (lower part) of the quarter pillar body 28, and is a member that reinforces the rear part of the side sill 12 and the lower part of the quarter pillar body 28.

The side sill stiffener 31 includes a hat cross section part 41, a welded part 42, a side sill stiffener lower ridge line part 43, a concave cross section part 44, a side sill stiffener upper flange (side sill stiffener flange) 45, a first side sill stiffener upper ridge line part 46, a second side sill stiffener upper ridge line part (side sill stiffener ridge line part) 47, a central side wall 48, and a side sill stiffener lower flange 49.

The hat cross section part 41 is disposed at the rear end part (rear end) of the side sill 12 and on the outer side in the vehicle width direction with respect to an inner panel 57.

Further, the hat cross section part 41 is formed to be convex outward in the vehicle width direction.

Specifically, the hat cross section part 41 includes, for example, a hat inclined side wall (inclined wall) 51, a hat upper part 52, a hat lower part (lower surface part of the hat cross section part 41) 53, a hat upper flange 54, and a hat lower flange 55.

The hat inclined side wall 51 is vertically disposed at a distance outward in the vehicle width direction with respect to the inner panel 57 of the side sill 12. The hat inclined side wall 51 is formed to incline inward in the vehicle width direction from a rear end part 58a of an outer panel 58 of the side sill 12 toward the central side wall 48 on the vehicle body rear side. The central side wall 48 is interposed between the hat cross section part 41 and the concave cross section part 44, and is disposed vertically in the vehicle body front-rear direction.

That is, the hat inclined side wall 51 is inclined so that a distance L from the inner panel 57 becomes smaller toward the vehicle body front-rear direction. Further, the hat inclined side wall 51 is disposed toward the rear side frame 13 by being inclined inward in the vehicle width direction.

The hat upper part 52 is bent inward in the vehicle width direction from the upper side of the hat inclined side wall 51. The hat lower part 53 is bent inward in the vehicle width direction from the lower side of the hat inclined side wall 51. Therefore, the hat inclined side wall 51, the hat upper part 52, and the hat lower part 53 are formed in a U-shaped cross section protruding outward in the vehicle width direction.

The hat upper flange 54 is bent upward from the inner side of the hat upper part 52. The hat upper flange 54 is, for example, joined to an inner upper flange 57a of the inner panel 57 by spot welding.

The hat lower flange 55 is bent downward from the inner side of the hat lower part 53. The hat lower flange 55 is, for example, joined to an inner lower flange 57b of the inner panel 57 by spot welding. The hat lower flange 55 forms the front side part of the side sill stiffener lower flange 49.

Therefore, the hat cross section part 41 is joined to the inner panel 57 from the outer side in the vehicle width direction.

The hat cross section part 41 is formed in a cross-sectional hat shape convex outward in the vehicle width direction by the hat inclined side wall 51, the hat upper part 52, the hat lower part 53, the hat upper flange 54, and the hat lower flange 55.

In the hat cross section part 41, a hat upper ridge line part 61 is formed by the intersection of the hat inclined side wall 51 and the hat upper part 52. Further, in the hat cross section part 41, a hat lower ridge line part (lower ridge line part) 63 is formed by the intersection of the hat inclined side wall 51 and the hat lower part 53.

Further, in the central side wall 48, a first lower ridge line part 65 and a second lower ridge line part (inclined ridge line part) 66 are formed along the lower side. The first lower ridge line part 65 and the second lower ridge line part 66 are formed by the intersection of the lower side of the central side wall 48 and a lower central part 48a. The lower central part 48a is, for example, joined to the inner lower flange 57b of the inner panel 57.

The first lower ridge line part 65 extends from a rear end 63a of the hat lower ridge line part 63 toward the vehicle body rear side in the extension direction of the hat lower ridge line part 63 (that is, the horizontal direction).

The second lower ridge line part 66 extends to incline upward from a rear end 65a of the first lower ridge line part 65 toward the vehicle body rear side. Specifically, the second lower ridge line part 66 is disposed on the vehicle body rear side with respect to the hat inclined side wall 51, and extends to incline upward (that is, toward the quarter pillar body 28) toward the vehicle body rear side along the shape of the bent part 25 (see FIG. 2) of the rear side frame 13 in a side view.

Here, the side sill stiffener lower ridge line part 43 is formed by the hat lower ridge line part 63, the first lower ridge line part 65, and the second lower ridge line part 66. The side sill stiffener lower ridge line part 43 is formed to extend in the vehicle body front-rear direction along the lower part of the side sill stiffener 31.

That is, the side sill stiffener lower ridge line part 43 includes the hat lower ridge line part 63 formed in the first half and includes the first lower ridge line part 65 and the second lower ridge line part 66 formed in the second half.

Further, the side sill stiffener lower ridge line part 43 communicates with a side sill lower ridge line part 67 of the side sill 12.

With reference back to FIGS. 2 and 3, a rear end 51a of the hat inclined side wall 51 is disposed on the vehicle body front side with respect to the bent part 25 of the rear side frame 13. Further, the hat inclined side wall 51 is inclined toward the rear side frame 13. In addition, the hat cross section part 41 is connected to the side sill 12. As a result, for example, a load generated due to the twisting of the vehicle body can be efficiently transmitted from the side sill 12 to the rear side frame 13 via the hat inclined side wall 51 of the hat cross section part 41 as shown by the arrow A.

Further, the side sill stiffener 31 forms the lower part of the quarter pillar body 28. As a result, a load generated on the side sill 12 due to the twisting of the vehicle body can be supported by the quarter pillar 15 and the rear side frame 13, and the bending rigidity of the side sill 12 (that is, the rigidity of the vehicle body rear part) can be increased.

Figure 8:
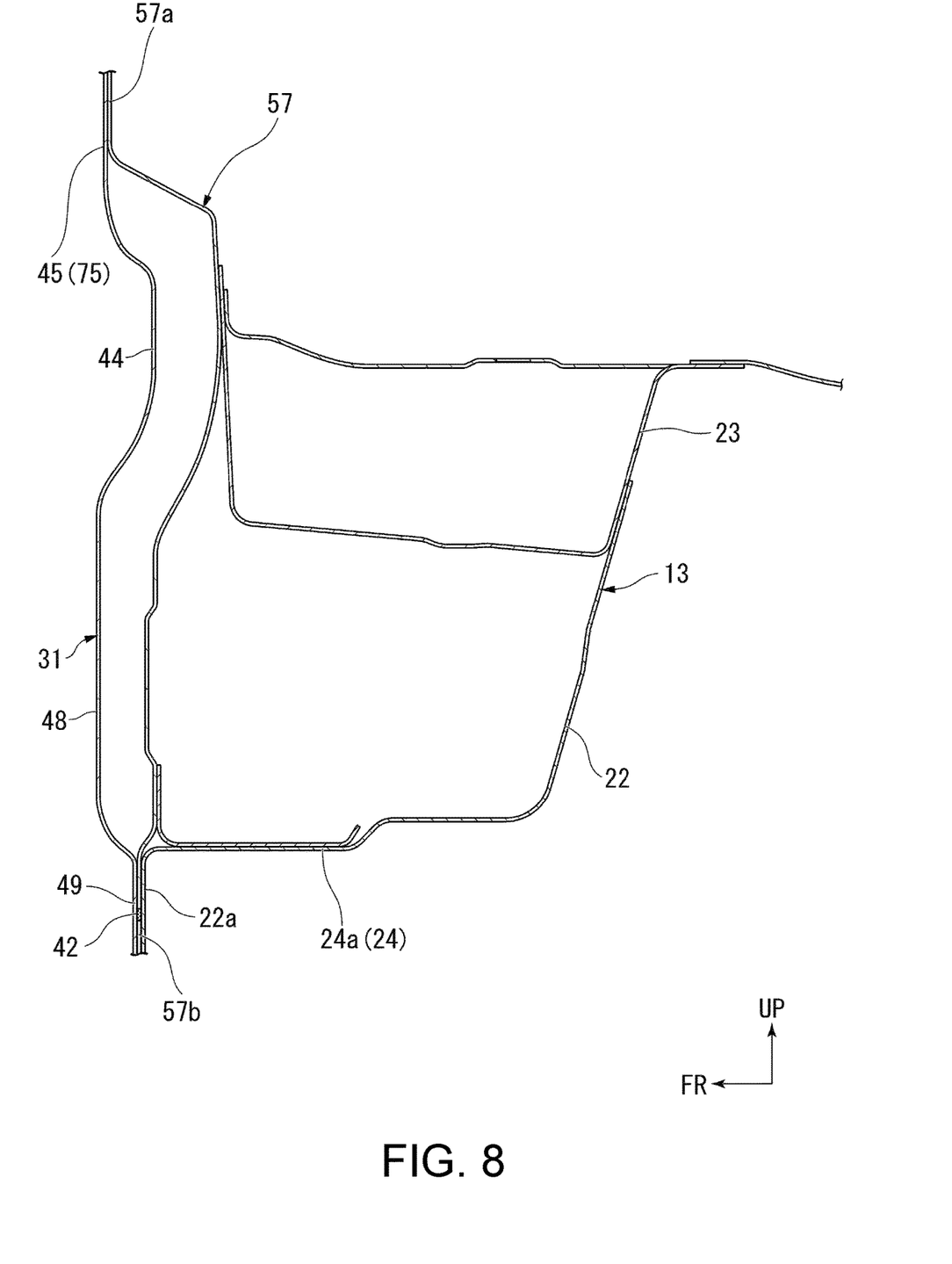
FIG. 8 is a cross-sectional perspective view taken along the line VIII-VIII of FIG. 6.

As shown in FIGS. 2 and 6, the welded part 42 is provided at the rear end part of the side sill stiffener lower flange 49. The welded part 42 is located on the vehicle body rear side with respect to the hat inclined side wall 51. The welded part 42 is a part that is joined to a connecting flange 22a of the connecting part 22 of the rear side frame 13 by spot welding, for example, via the inner lower flange 57b (see FIG. 8) of the inner panel 57.

The welded part 42 is provided at a position on the vehicle body front side with respect to the bent part 25 and a position overlapping the bent part 25 in the vehicle body front-rear direction. As a result, for example, a load applied to the side sill 12 due to the twisting of the vehicle body can be more efficiently transmitted to the rear side frame 13 via the welded part 42 as shown by the arrow A (see FIG. 3).

In addition, in the embodiment, an example in which the welded part 42 is provided at a position on the vehicle body front side with respect to the bent part 25 and a position overlapping the bent part 25 is described, but the disclosure is not limited thereto. For another example, for example, the welded part 42 may be provided at one of a position on the vehicle body front side with respect to the bent part 25 and a position overlapping the bent part 25.

As shown in FIGS. 6 and 7, the hat cross section part 41 is disposed so that the hat lower part 53 overlaps a front lower part 24a of the lower connecting part 24 of the connecting part 22 in the up-down direction. The front lower part 24a of the connecting part 22 is a lower surface part on the vehicle body front side with respect to the bent part 25.

Therefore, the hat lower part 53 can be set at the same height as the front lower part 24a of the connecting part 22 on the vehicle body front side with respect to the bent part 25. As a result, for example, a load applied to the side sill 12 due to the twisting of the vehicle body can be more efficiently transmitted to the rear side frame 13 via the hat cross section part 41 as shown by the arrow A (see FIG. 3).

Further, as described above, the second lower ridge line part 66 is disposed on the vehicle body rear side with respect to the hat inclined side wall 51, and the second lower ridge line part 66 is inclined upward (toward the quarter pillar body 28) toward the vehicle body rear side along the shape of the bent part 25 (see FIG. 2). Therefore, for example, even if a part of the load applied to the side sill 12 due to the twisting of the vehicle body cannot be completely transmitted to the rear side frame 13, it can be transmitted to the quarter pillar body 28 via the second lower ridge line part 66 as shown by the arrow B. That is, the load applied to the side sill 12 can be supported by the rear side frame 13 and the quarter pillar 15 (particularly, the quarter pillar body 28) without being transmitted to the rear wheel house 16.

Here, the rigidity of the rear wheel house 16 is suppressed as compared with the side sill 12, the roof side rail 14 (see FIG. 4), the quarter pillar 15, and the like that form the skeleton of the vehicle body. As a result, for example, the load applied to the side sill 12 due to the twisting of the vehicle body can be supported by the rear side frame 13 and the quarter pillar body 28 without being transmitted to the rear wheel house 16, whereby the rigidity of the vehicle body rear part can be increased.

In addition, as described above, the second lower ridge line part 66 is inclined along the shape of the bent part 25 of the rear side frame 13. As a result, for example, the load applied to the side sill 12 can be transmitted to the rear side frame 13 via the second lower ridge line part 66 as shown by the arrow C (see FIG. 3).

As shown in FIGS. 2 and 6, the concave cross section part 44 is provided on the vehicle body rear side with respect to the hat cross section part 41 and is formed convex inward in the vehicle width direction (that is, concave outward in the vehicle width direction).

The concave cross section part 44 has, for example, a concave side wall 71, a concave upper part 72, a concave upper ridge line part 73, a concave lower part 74, and a concave flange 75.

The concave side wall 71 is disposed at a distance inward in the vehicle width direction with respect to the central side wall 48. The concave side wall 71 is joined to, for example, the rear wheel house 16.

The concave upper part 72 is bent outward in the vehicle width direction from the upper side of the concave side wall 71. The concave upper part 72 is continuously formed at a rear end 52a of the hat upper part 52, and extends to incline upward toward the vehicle body rear side.

The concave upper ridge line part 73 is formed by the intersection of the concave side wall 71 and the concave upper part 72. The concave upper ridge line part 73 is continuously formed at a rear end 61a of the hat upper ridge line part 61, and extends to incline upward toward the vehicle body rear side.

The concave lower part 74 is, for example, horizontally bent outward in the vehicle width direction from the lower side of the concave side wall 71 to the central side wall 48. The central side wall 48 is bent downward from the outer side of the concave lower part 74.

The concave flange 75 is raised upward from the outer side of the concave upper part 72. The concave flange 75 is continuously formed at a rear end 54a of the hat upper flange 54, and extends to incline upward toward the vehicle body rear side. The concave flange 75 is, for example, similar to the hat upper flange 54, joined to the inner upper flange 57a of the inner panel 57 (see FIG. 8 for both) by spot welding.

Further, the concave cross section part 44 (that is, the concave side wall 71, the concave upper part 72, the concave lower part 74, and the concave flange 75) forms a hat cross section protruding inward in the vehicle width direction together with the central side wall 48.

Figure 9:
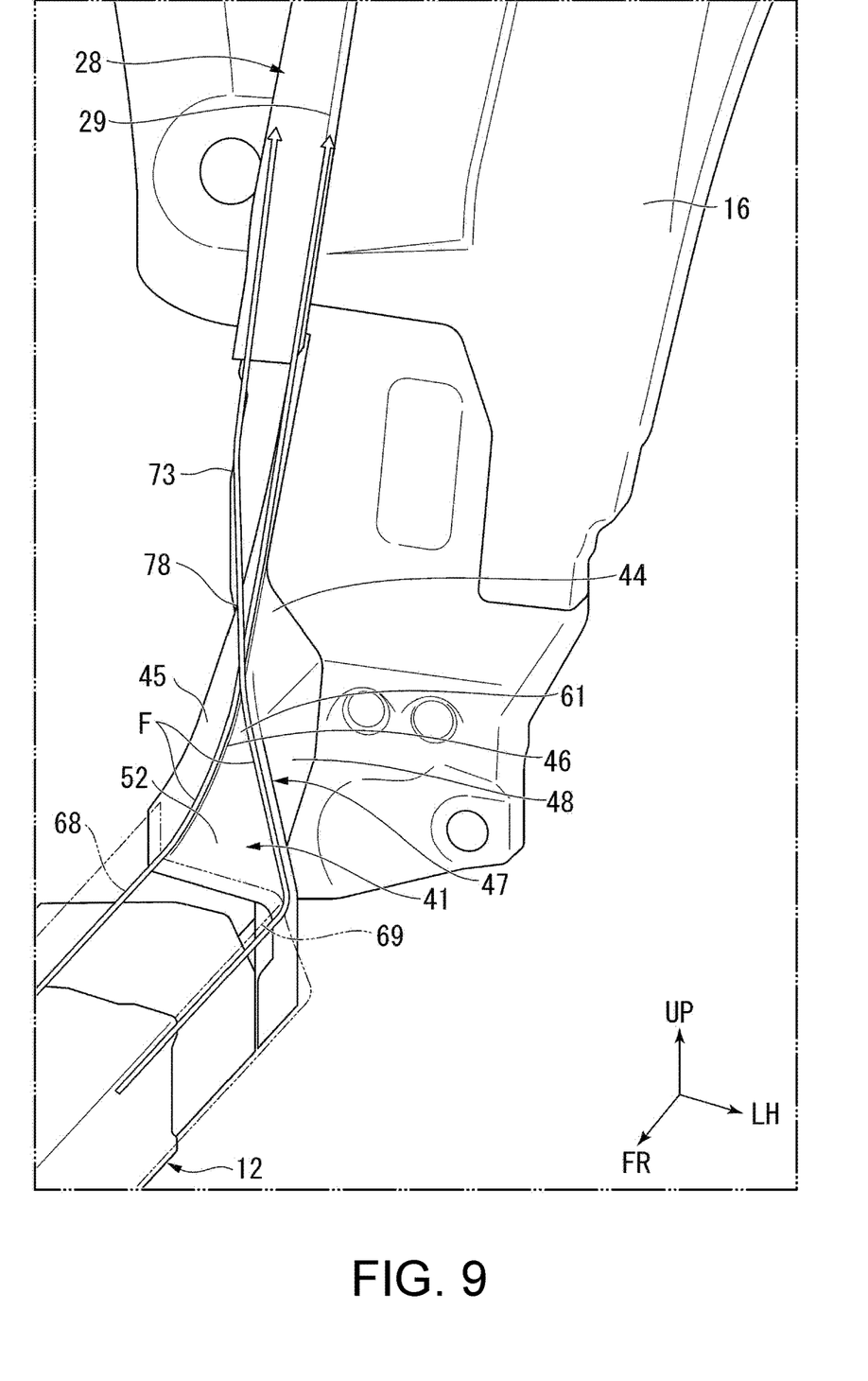
FIG. 9 is a perspective view of the vehicle body rear part structure of an embodiment as viewed from the upper left side of the vehicle body front side.

As shown in FIGS. 6 and 9, the side sill stiffener upper flange 45 is formed by the hat upper flange 54 and the concave flange 75. The side sill stiffener upper flange 45 is continuously provided on the upper part (upper side) of the side sill stiffener 31 in the vehicle body front-rear direction. The side sill stiffener upper flange 45 forms the lower part (part) of the door opening pillar flange 29.

The first side sill stiffener upper ridge line part 46 is formed on the lower side of the side sill stiffener upper flange 45.

Further, the second side sill stiffener upper ridge line part 47 extends to intersect the first side sill stiffener upper ridge line part 46 in the vehicle body front-rear direction.

The first half of the second side sill stiffener upper ridge line part 47 is formed by the hat upper ridge line part 61, and the second half is formed by the concave upper ridge line part 73. The second side sill stiffener upper ridge line part 47 is continuously provided below the side sill stiffener upper flange 45 in the vehicle body front-rear direction, and forms a lower part (part) of a second load support ridge line part 102 (to be described later) of the quarter pillar body 28.

The second side sill stiffener upper ridge line part 47 is continuously provided to intersect the side sill stiffener upper flange 45 (that is, the first side sill stiffener upper ridge line part 46) at an intersection 78 in a top view.

Further, the first side sill stiffener upper ridge line part 46 communicates with the first side sill upper ridge line part 68 of the side sill 12. The second side sill stiffener upper ridge line part 47 communicates with the second side sill upper ridge line part 69 of the side sill 12.

The reason why the second side sill stiffener upper ridge line part 47 intersects the side sill stiffener upper flange 45 will be described in detail later.

(Damper Stiffener)

As shown in FIGS. 4 and 5, the damper stiffener 33 is provided above the rear wheel house 16 and beside a damper housing 17 from the outer side in the vehicle width direction. The damper stiffener 33 is joined to the quarter pillar stiffener 32 (to be described later) and the roof side rail 14. The damper stiffener 33 includes a damper stiffener body part 81 and a damper stiffener flange part 82.

The damper stiffener body part 81 is formed in a trapezoidal shape in a side view by a front side 81a, a rear side 81b, an upper side 81c, and a lower side 81d.

The lower side 81d is, for example, joined to the rear wheel house 16 by spot welding. The front side 81a and the rear side 81b are, for example, joined to the damper housing 17 by spot welding. The upper side 81c is, for example, joined to the roof side rail 14 by spot welding.

The damper stiffener body part 81 has a first opening 84 formed above the damper housing 17 and a second opening 85 formed above the first opening 84.

The damper stiffener flange part 82 has a first damper flange 86, a second damper flange 87, and a third damper flange 88.

The first damper flange 86 is provided on the vehicle body front side of the damper stiffener body part 81. Specifically, the first damper flange 86 protrudes from the front side 81a of the damper stiffener body part 81 toward the vehicle body front side, and forms an upper outer part of the quarter pillar body 28 (including the door opening pillar flange 29).

The first damper flange 86 is, for example, joined to an inner of the upper part of the door opening pillar flange 29 (hereinafter also referred to as the upper inner of the door opening pillar flange 29) by spot welding. Further, the first damper flange 86 is, for example, joined by spot welding in a state where its lower end part 86a overlaps an upper end part 32a of the quarter pillar stiffener 32 (to be described later) from the outer side in the vehicle width direction.

The first damper flange 86 has, for example, a first damper stiffener ridge line part 91 and a second damper stiffener ridge line part 92.

The first damper stiffener ridge line part 91 and the second damper stiffener ridge line part 92 are disposed at a distance from each other in the vehicle body front-rear direction and extend in the longitudinal direction of the first damper flange 86.

The second damper flange 87 is provided on the vehicle body rear side of the damper stiffener body part 81. Specifically, the second damper flange 87 protrudes from the rear side 81b of the damper stiffener body part 81 toward the vehicle body rear side. The second damper flange 87 is, for example, joined to the roof side rail 14 by spot welding from the outer side in the vehicle width direction.

The third damper flange 88 is provided on the upper side (that is, the vehicle body upper side) of the damper stiffener body part 81. Specifically, the third damper flange 88 extends from the upper part of the front side 81a of the damper stiffener body part 81 to the vehicle body front side along the roof side rail 14. The third damper flange 88 is, for example, joined to the roof side rail 14 by spot welding from the outer side in the vehicle width direction.

In addition, in the embodiment, an example in which both flanges of the second damper flange 87 and the third damper flange 88 are joined to the roof side rail 14 is described, but the disclosure is not limited thereto. As another example, for example, one flange of the second damper flange 87 and the third damper flange 88 may be joined to the roof side rail 14.

(Quarter Pillar Stiffener)

The quarter pillar stiffener 32 is continuously disposed at an upper end 31a of the side sill stiffener 31 and is provided at the central part in the up-down direction of the quarter pillar body 28. The quarter pillar stiffener 32 includes a quarter pillar stiffener body part 95 and a quarter pillar stiffener flange 96.

The quarter pillar stiffener body part 95 is, for example, joined to the inner (for example, the rear wheel house 16) in the central part in the up-down direction of the quarter pillar body 28 by spot welding from the outer side in the vehicle width direction.

The quarter pillar stiffener flange 96 is, for example, joined to the inner of the central part in the up-down direction of the door opening pillar flange 29 (hereinafter also referred to as the central inner of the door opening pillar flange 29) by spot welding from the outer side in the vehicle width direction. That is, the quarter pillar stiffener flange 96 forms the central part in the up-down direction of the door opening pillar flange 29.

In this way, the quarter pillar stiffener body part 95 is joined to the inner of the quarter pillar body 28 (for example, to the rear wheel house 16), and the quarter pillar stiffener flange 96 is joined to the central inner of the door opening pillar flange 29. As a result, the quarter pillar body 28 (that is, the quarter pillar 15) is reinforced by the quarter pillar stiffener 32.

Further, the quarter pillar stiffener body part 95 has, for example, a first quarter pillar stiffener ridge line part 98 and a second quarter pillar stiffener ridge line part 99. The first quarter pillar stiffener ridge line part 98 and the second quarter pillar stiffener ridge line part 99 are disposed at a distance from each other in the vehicle body front-rear direction and extend in the longitudinal direction of the quarter pillar stiffener flange 96.

The first quarter pillar stiffener ridge line part 98 is formed to communicate with the first side sill stiffener upper ridge line part 46 and the first damper stiffener ridge line part 91 (also see FIG. 4). The second quarter pillar stiffener ridge line part 99 is formed to communicate with the second side sill stiffener upper ridge line part 47 and the second damper stiffener ridge line part 92 (also see FIG. 4).

As shown in FIGS. 4 and 6, for example, in the load support part 30, the side sill stiffener 31 is joined to the side sill 12, the rear wheel house 16, the rear side frame 13, and the like. Further, the damper stiffener 33 is joined to, for example, the rear wheel house 16, the damper housing 17, the upper inner of the door opening pillar flange 29, the roof side rail 14, and the like. Further, the quarter pillar stiffener 32 is joined to, for example, the rear wheel house 16, the central inner of the door opening pillar flange 29, and the like.

In this state, the lower part of the door opening pillar flange 29 is formed by the side sill stiffener upper flange 45. Further, the upper part of the door opening pillar flange 29 is formed by the first damper flange 86. Further, the central part of the door opening pillar flange 29 is formed by the quarter pillar stiffener flange 96.

That is, the load support part 30 includes the outer that is joined to the inner of the door opening pillar flange 29 from the outer side in the vehicle width direction. Further, the load support part 30 includes the outer that is joined to the inner of the quarter pillar body 28 from the outer side in the vehicle width direction.

Further, in the load support part 30, a first load support ridge line part (load support ridge line part) 101 is formed by the first side sill stiffener upper ridge line part 46, the first quarter pillar stiffener ridge line part 98, and the first damper stiffener ridge line part 91.

Further, in the load support part 30, a second load support ridge line part (load support ridge line part) 102 is formed by the second side sill stiffener upper ridge line part 47, the second quarter pillar stiffener ridge line part 99, and the second damper stiffener ridge line part 92.

The first load support ridge line part 101 and the second load support ridge line part 102 are disposed extending continuously from the front end of the side sill stiffener 31 to the roof side rail 14.

In addition, in the embodiment, an example in which the load support part 30 includes the first load support ridge line part 101 and the second load support ridge line part 102 has been described, but the disclosure is not limited thereto. As another example, for example, the load support part 30 may include only one of the first load support ridge line part 101 and the second load support ridge line part 102.

As described above, according to the vehicle body rear part structure 10 of the embodiment, for example, when the vehicle body is twisted, the side sill 12 and the roof side rail 14 are bent, whereby the quarter pillar 15 is pulled, and a tensile load is applied to the quarter pillar 15.

Therefore, in the embodiment, the load support part 30 of the quarter pillar 15 is formed by the side sill stiffener 31, the quarter pillar stiffener 32, and the damper stiffener 33. Further, the load support part 30 includes the outer that is joined to the inner of the door opening pillar flange 29 from the outer side in the vehicle width direction. The door opening pillar flange 29 forms the pillar edge of the door opening 20.

Therefore, the rigidity of the door opening pillar flange 29 is ensured by the load support part 30. That is, the rigidity of the quarter pillar 15 (particularly, the quarter pillar body 28) is ensured by the door opening pillar flange 29. As a result, a tensile load applied to the quarter pillar 15 can be sufficiently supported by the load support part 30.

Further, the load support part 30 includes the damper stiffener 33 as a member for reinforcing the quarter pillar 15. The damper stiffener is joined to the roof side rail. Therefore, the tensile load concentrated on the quarter pillar 15 (particularly, the quarter pillar body 28) can be distributed to the roof side rail 14 and to the vehicle body rear part via the roof side rail 14. As a result, for example, the rigidity of the vehicle body rear part can be increased against the twisting of the vehicle body.

Further, the first load support ridge line part 101 and the second load support ridge line part 102 are disposed extending continuously from the front end of the side sill stiffener 31 to the roof side rail 14 via the quarter pillar 15. Further, the second damper flange 87 and the third damper flange 88 of the damper stiffener flange part 82 are joined to the roof side rail 14.

Therefore, a load (tensile load) applied to the quarter pillar 15 can be transmitted to the roof side rail 14 via the first load support ridge line part 101 and the second load support ridge line part 102 as shown by the arrow D (see FIG. 4). Further, a load transmitted to the roof side rail 14 can be transmitted to the vehicle body rear side via the roof side rail 14 as shown by the arrow E (see FIG. 4). Therefore, the load applied to the connection part between the quarter pillar 15 and the roof side rail 14 can be alleviated. As a result, for example, the rigidity of the vehicle body rear part can be increased against the twisting of the vehicle body.

Further, the first damper flange 86 of the damper stiffener flange part 82 is provided on the upper inner of the quarter pillar body 28. As a result, the quarter pillar body 28 is reinforced by the first damper flange 86, and the rigidity of the quarter pillar body 28 (that is, the quarter pillar 15) is ensured. As a result, for example, the rigidity of the vehicle body rear part can be further increased against the twisting of the vehicle body.

Further, the side sill stiffener 31 is provided with the second side sill stiffener upper ridge line part 47 and the side sill stiffener upper flange 45. Further, the lower part of the second load support ridge line part 102 of the quarter pillar body 28 is formed by the second side sill stiffener upper ridge line part 47. Further, the lower part of the door opening pillar flange 29 is formed by the side sill stiffener upper flange 45.

In addition, the second side sill stiffener upper ridge line part 47 and the side sill stiffener upper flange 45 (that is, the first side sill stiffener upper ridge line part 46) are continuously provided to intersect at the intersection 78 (see FIG. 9) in a top view.

Here, the side sill stiffener 31 is provided to be continuous with the quarter pillar 15 (particularly, the quarter pillar body 28) that has high rigidity.

Therefore, a load applied to the side sill 12 can be transmitted as shown by the arrow F (see FIG. 9) via the second side sill stiffener upper ridge line part 47 and the side sill stiffener upper flange 45 (that is, the first side sill stiffener upper ridge line part 46). As a result, a load applied to the side sill 12 can be efficiently transmitted to the quarter pillar body 28 that has high rigidity.

The technical scope of the disclosure is not limited to the above-described embodiments, and various modifications may be made without departing from the spirit of the disclosure.

In addition, it is possible to replace the components in the embodiments with known components as appropriate without departing from the spirit of the disclosure, and the above-described modifications may be combined as appropriate.

What is claimed is:

1. A vehicle body rear part structure comprising:
   a side sill that is disposed extending below a door opening and in a vehicle body front-rear direction;
   a roof side rail that is disposed extending above the door opening and in the vehicle body front-rear direction;
   a quarter pillar that connects a vehicle body rear side of the side sill and the roof side rail; and
   a rear wheel house that forms a part of the quarter pillar,
   wherein the quarter pillar comprises a load support part that has a door opening flange that forms an edge part of the door opening,
   wherein the load support part comprises:
      a side sill stiffener that reinforces the side sill and forms a part of the quarter pillar;
      a quarter pillar stiffener that is provided continuously with the side sill stiffener and reinforces the quarter pillar; and
      a damper stiffener that is provided above the rear wheel house and joined to the quarter pillar stiffener and the roof side rail,
   wherein the load support part comprises:
      at least one ridge line part that is disposed extending continuously from a front end of the side sill stiffener to the roof side rail.

2. The vehicle body rear part structure according to claim 1, wherein the damper stiffener comprises a damper stiffener body part and a damper stiffener flange part, and
   in the damper stiffener flange part,
      a first damper flange on a vehicle body front side is provided above the door opening flange, and
      at least one of a second damper flange on the vehicle body rear side and a third damper flange on a vehicle body upper side is joined to the roof side rail.

3. The vehicle body rear part structure according to claim 1, further comprising:
   a rear side frame that is connected to the side sill on an inner side in a vehicle width direction and has a bent part inclined upward toward the vehicle body rear side,
   wherein the side sill stiffener comprises a hat cross section part that is disposed at a rear end of the side sill and on an outer side in the vehicle width direction and is convex outward in the vehicle width direction,
   the hat cross section part is provided with an inclined wall that is inclined inward in the vehicle width direction toward the vehicle body rear side, and
   a rear end of the inclined wall is disposed on a vehicle body front side with respect to the bent part of the rear side frame.

4. The vehicle body rear part structure according to claim 2, further comprising:
   a rear side frame that is connected to the side sill on an inner side in a vehicle width direction and has a bent part inclined upward toward the vehicle body rear side,
   wherein the side sill stiffener comprises a hat cross section part that is disposed at a rear end of the side sill and on an outer side in the vehicle width direction and is convex outward in the vehicle width direction,
   the hat cross section part is provided with an inclined wall that is inclined inward in the vehicle width direction toward the vehicle body rear side, and
   a rear end of the inclined wall is disposed on the vehicle body front side with respect to the bent part of the rear side frame.

5. The vehicle body rear part structure according to claim 3, wherein the side sill stiffener is provided with a welded part joined to the rear side frame on the vehicle body rear side with respect to the inclined wall, and
   the welded part is provided at at least one of a position on the vehicle body front side with respect to the bent part and a position overlapping the bent part in the vehicle body front-rear direction.

6. The vehicle body rear part structure according to claim 4, wherein the side sill stiffener is provided with a welded part joined to the rear side frame on the vehicle body rear side with respect to the inclined wall, and
   the welded part is provided at at least one of a position on the vehicle body front side with respect to the bent part and a position overlapping the bent part in the vehicle body front-rear direction.

7. The vehicle body rear part structure according to claim 3, wherein the rear side frame comprises:
   a frame body part that extends to the vehicle body rear side; and
   a connecting part that is connected to the side sill and has the bent part formed thereon,
   wherein in the connecting part, a lower surface part on the vehicle body front side with respect to the bent part overlaps a lower surface part of the hat cross section part in an up-down direction.

8. The vehicle body rear part structure according to claim 4, wherein the rear side frame comprises:
   a frame body part that extends to the vehicle body rear side; and
   a connecting part that is connected to the side sill and has the bent part formed thereon,
   wherein in the connecting part, a lower surface part on the vehicle body front side with respect to the bent part overlaps a lower surface part of the hat cross section part in an up-down direction.

9. The vehicle body rear part structure according to claim 5, wherein the rear side frame comprises:
   a frame body part that extends to the vehicle body rear side; and
   a connecting part that is connected to the side sill and has the bent part formed thereon,
   wherein in the connecting part, a lower surface part on the vehicle body front side with respect to the bent part overlaps a lower surface part of the hat cross section part in an up-down direction.

10. The vehicle body rear part structure according to claim 3, wherein the side sill stiffener has a side sill stiffener lower ridge line part that forms a lower ridge line part of the hat cross section part and extends in the vehicle body front-rear direction, and
    the side sill stiffener lower ridge line part has an inclined ridge line part that is disposed on the vehicle body rear side with respect to the inclined wall and is inclined upward toward the vehicle body rear side.

11. The vehicle body rear part structure according to claim 10, wherein the inclined ridge line part is inclined along the shape of the bent part of the rear side frame in a side view.

12. The vehicle body rear part structure according to claim 3, wherein the side sill stiffener comprises a concave cross section part that is provided on the vehicle body rear side with respect to the hat cross section part and is convex inward in the vehicle width direction,
    the hat cross section part and the concave cross section part comprise:

a side sill stiffener flange that is continuously provided in the vehicle body front-rear direction at an upper part and forms the door opening flange; and a side sill stiffener ridge line part that is continuously provided in the vehicle body front-rear direction below the side sill stiffener flange and forms a ridge line of the door opening, and the side sill stiffener ridge line part is continuously provided to intersect the side sill stiffener flange in a top view.

* * * * *